Feb. 20, 1973  R. J. NOVOTNY  3,717,105
FLUID BOLSTER SPRING
Filed Dec. 22, 1970
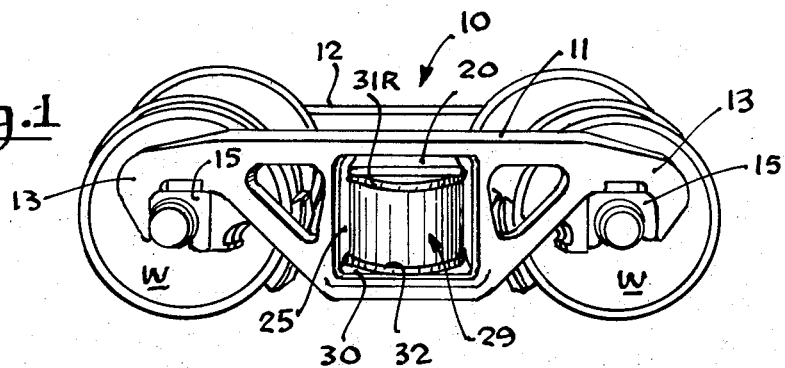
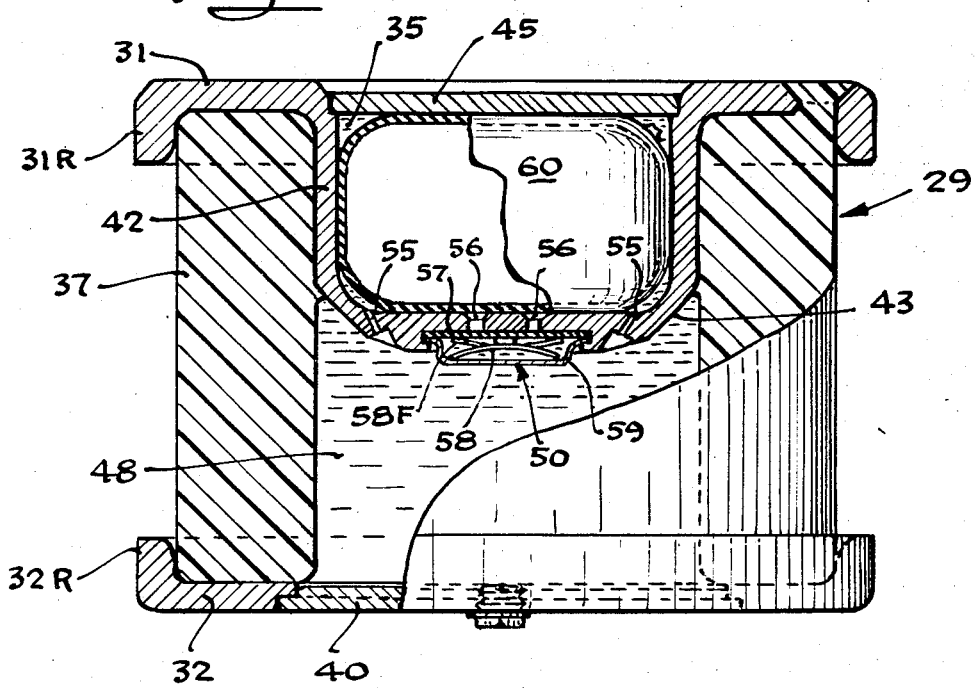
Inventor
Raymond J. Novotny
By Kinzer, Dorn and Zickert
Attorneys 3,717,105
FLUID BOLSTER SPRING
Raymond J. Novotny, Sparta, N.J., assignor to Abex
 Corporation, New York, N.Y.
Filed Dec. 22, 1970, Ser. No. 100,617
Int. Cl. B61f 5/10; F16f 5/00, 9/08
U.S. Cl. 105—197 B     3 Claims

ABSTRACT OF THE DISCLOSURE

A suspension for the bolster of a railroad car is characterized by two relatively movable chambers, separated by an elastomeric sleeve constituting the main spring. The two chambers communicate through normally open damping passages through which oil may bleed from one chamber to the other when the spring is compressed, and a one-way valve system allows unrestricted oil flow in a return sense when the spring distends upon removal of a kinetic load.

---

This invention relates to a vehicle fluid suspension device for supporting a load represented by the bolster of a railroad car.

The so-called "Rock and Roll" phenomenon is not new to the railroad industry but is becoming more of a problem due to the increasing number of cars which have high centers-of-gravity. The problem arises when the natural rocking (side-to-side) frequency of the car coincides with the rail input or forcing function; if this motion is not damped, car overturning and derailment follow. Surprisingly, the unstable rocking motion of these high center-of-gravity cars becomes critical at relatively low speeds (about 1 c.p.s. at 20 m.p.h. with a 50% track-joint misalignment). This is due to the lack of damping inherent in the mechanical spring suspension systems of typical railroad freight cars.

A typical freight car truck spring suspension system consists of clusters of standard helical springs, and it is the object of this invention to provide a damped suspension means for current freight cars that will replace the existing spring clusters without otherwise requiring modification to existing structures. Specifically, it is an object of the present invention to utilize an elastomer (synthetic rubber) bonded to metal to produce a design that includes both a spring and a damping means readily integrated into a compact structure for installation in the truck. Further, in addition to replacing the metal spring means, the use of an elastomer in the present suspension device accomplishes the following objectives:

(1) A sealed hydraulic chamber for damping is easily achieved because the elastomer can be bonded directly to metal support structures;

(2) The use of an elastomer as a spring in the compression mode;

(3) An elastomer bonded to the suspension unit via the top and bottom plates;

(4) The top plate is dished to define an overflow chamber for damping oil and preferably containing a flexible gas bag to prevent aeration of hydraulic fluid oil;

(5) Hydraulic damping orifices constantly communicating the two chambers and return (drain) passages which are closed during spring compression.

Other and further objects of the present invention will be apparent from the following description and claims and are illustrated in the accompanying drawings which, by way of illustration, shows a preferred embodiment of the present invention and the principle thereof and what is now considered to be the best mode contemplated for applying that principle. Other embodiments of the invention embodying the same or equivalent principle may be used and structural changes may be made as desired by those skilled in the art without departing from the present invention.

In the drawings:

FIG. 1 is a perspective view, on a reduced scale, of the truck of a railroad car equipped with a suspension unit under the present invention; and FIG. 2 is a sectional view of a suspension unit member constructed in accordance with the preferred embodiment of the present invention.

A typical railroad car truck in which the present invention may be embodied is illustrated in FIG. 1, being identified as a whole by the reference character 10. The truck includes a pair of side frames 11 and 12 of identical construction, and the end of each frame is so formed with a pedestal 13, or otherwise, as to embrace a bearing 15 which in turn sets on the journal portion of the axle of the car wheel W.

The construction of car trucks varies rather widely from the standpoint of the actual contour, and there are various standards designed around the actual form of bearing; but in any event, the truck side frames are spanned by a bolster 20 which will extend transverse to the long axis of the car body or frame. Again there are different variations and standards, though in the past the conventional arrangement has been one where the bolster is supported by relatively large coil springs in a bundle or pack located within a large opening as 25 formed in a medial portion of each side frame.

There will be at least one such truck 10 at each end of the car body with the end portion of the car body in turn resting on the medial portion of the span of the bolster between the two side frames 11 and 12. While not shown in the present drawings, the conventional arrangement is to provide the frame of the car with a center plate fitting in a concavity or so-called bowl located top side center in the bolster; and the truck is articulated by a king pin, allowing curved sections in the track to be navigated.

Thus it will be seen that the entire weight of the car body, at opposite ends, is imposed on the spring supported bolsters, and in accordance with the present invention, the coil springs heretofore used are supplanted by a suspension member 29 interposed between the underside of the bolster 20 at opposite ends thereof and the bottom support plate 30 of the truck side frame, FIG. 1. The weight of the car on the bolster becomes the sprung or suspended mass, and the bottom plate 30 becomes the fixed or unsprung support.

FIG. 2 is a sectional view illustrating the construction of the suspension unit 29 which includes an upper housing plate 31 and a lower housing plate 32 axially aligned one with another.

The upper housing plate 31 is formed with a downwardly extending peripheral rib 31R, and the center of the plate is cup-shaped downward for a considerable length to afford an internal cavity or chamber 35, the purpose of which will be described below.

The bottom housing plate 32 has an upwardly extending peripheral rib 32R and a hollow cylinder or sleeve 37 of elastomeric material is nested between the plates 31 and 32 in axial alignment therewith to constitute the main spring of the suspension unit. Preferably the elastomer is solid (non-porous) polyurethane, but it may be any elastomer capable of serving heavy loads of the order here involved. It will be apparent from FIG. 2 that the outside diameter of the sleeve 37 is substantially identical to the inside diameters of the ribs 31R and 32R. In fact, the plates 31 and 32 are set in a mold and the material from which the sleeve 37 is formed is introduced into the mold and cast therein to the shape shown in FIG. 2 in the form of a hollow cylinder. During the casting operation, the raw material forming the sleeve 37 is cured under heat and bonds itself to the opposed surfaces of the plate 31 and 32 as if the parts were welded.

Vent holes are formed in the top plate 31 to facilitate cooling of the elastomeric material during casting by bleeding off air trapped in the mold and allowing the escape of gases generated during the chemical reactions characterising cure of the raw material forming the elastomeric sleeve 37.

The bottom plate 32 is in the form of an annulus to enable the aforesaid mold to be provided with a core incidental to casting the elastomeric sleeve. After the parts are extracted from the mold, the center opening in the bottom plate 32 is closed by a disc 40 which is preferably welded in place by an electron beam.

It was mentioned above that the top plate 31 is cup-shaped at the center, and such configuration is characterized by an axially extending side wall 42 and a transverse bottom wall 43 which together with a top disc 45 define the top chamber 35.

Thus it will be seen that the top plate 31 is not only configured to support one end of the bolster 20, but is also configured to present wall elements 42 and 43 which define a top chamber 35 located within the bore of the elastomer sleeve 37. The transverse wall 43 is located approximately mid-way of the bore of the sleeve 37, and this wall together with the internal wall of the sleeve 37 and the bottom disc 40 define a second chamber 48 which contains hydraulic fluid (oil). In fact, oil fills the unoccupied volume of chambers 35 and 48.

It will be recognized from what has thus far been described that the sleeve 37 represents the principal or main spring of the suspension unit and the parts are so arranged that sleeve 37 is normally subjected to compressive loading. As long as this loading is at a steady condition, the load is supported by the spring 37, but on sudden compression loading (downward thrust) it becomes important to dampen spring 37. To this end, a one-way valve means 50 is interposed between chambers 35 and 48, effective to impose the desired damping action, characterized by flow of oil from chamber 48 to chamber 35, while allowing rapid return of oil from chamber 35 to chamber 48 when the sudden load is removed in a manner now to be described.

Thus, as shown in FIG. 2, wall 43 is recessed, the recess being provided at its periphery with a pair of narrow damper passage 55 which constantly communicate chambers 35 and 48. Formed centrally in wall 43 are a plurality of larger drain passages 56, and located at the underside thereof is a one-way flap valve 57 normally held in a closing position against the lower ends of the passages 56 by spring fingers 58F bent from a spring disc 58. The spring disc 58 is held in position by a retainer 59, characterized by an open network of spring-like fingers, snap-fitted into a corresponding notch at the underside of wall 43.

It will be appreciated that when a sudden thrust or downward loading is imposed on top plate 31, tending to compress sleeve 37, wall 43 moves downwardly into chamber 48, reducing its volume, whereupon oil is displaced and flows through the damper passage 55 into chamber 35; valve element continues to close the drain passages 56, accounting for the desired restricted damping action.

Chamber 35 is virtually filled with an air bag 60 which prevents aeration of oil surging into chamber 35 through the damper passages 55, which compresses air bag 60.

On the other hand, when the dynamic load is removed, the spring returns or distends to its normal state, valve 57 drops, in effect, disclosing the drain passages 56 so that there is a rapid return of oil from chamber 35 to chamber 48, surging through the passages 55 and 56.

In other words, under static load conditions, the elastomer sleeve 37 performs a normal spring function, deflecting in proportion to variations in the load imposed thereon. Oil may be slowly forced from the oil chamber 48 to the receiving chamber 35 by way of the damping orifices or passages 55, but it is assumed that under steady or static conditions such oil transfer is relatively slow with little pressure drop across the damping orifices 55; and there may be a slight increase of pressure within gas bag 60 due to the displaced oil, thereby providing additional support for the applied load. On the other hand, under dynamic load conditions, such as side-to-side rocking motion of a railroad car truck, the downward deflection of the top plate is relatively swift and displacement of oil from hydraulic chamber 48 to the gas chamber 35 through the damping passages 55 is at a high velocity or flow rate, developing a significant pressure drop which resists the rate at which the downward motion of the top plate may occur. This resistance is proportional to the downward velocity of the top plate 31 and prevents a resonant condition from being achieved, which in the instance of a railroad car might otherwise likely result in a derailment.

I am aware of the suspension units disclosed in U.S. Pat. No. 2,818,249 and British Pat. No. 620,144. In this collective prior art, there is no concept of a one-way valve which allows for desired damping action in compression of an elastomeric spring body as well as rapid return of damping oil in distention of the spring member which is critical to the elimination of resonance in a swaying railroad car under the principle of the present invention.

The preferred embodiment has been disclosed; structural changes may be made, particularly as to the valve, without departing from the principle of the invention.

I claim:

1. In a railroad car truck characterized by a side frame representing an unsprung body and a bolster representing the mass to be sprung, a suspension unit comprising a pair of spaced axially aligned housing plates interposed between the side frame and the bolster, a hollow deflectable sleeve of urethane elastomer having the ends thereof interposed between and bonded to said plates, said sleeve being centered with respect to said plates thereby to constitute the spring of the suspension which is under compression between the plates when a load is imposed on the suspension unit, means deflectable with the sleeve within the bore of said sleeve and presenting a wall extending transversely of said bore to define a first chamber within the cylinder bore, a remaining portion of the bore of said sleeve itself defining a second chamber constituting a reservoir for oil used to dampen the action of said spring when compressed, said wall having damping passage means therein constantly communicating both chambers and through which oil may bleed to the first chamber in a restricted flow to dampen the suspension unit when the wall displaces oil in the second chamber due to compression loading, said wall having drain passage means therein, and a one-way valve closing said drain passage means during the flow of damping oil from the second chamber to the first chamber thereby to restrict oil flow to said damping passage means, said one-way valve disclosing the drain passage means when the spring is unloaded whereby oil transmitted to the first chamber may surge rapidly to the second chamber through both passage means when the spring is unloaded.

2. A suspension unit according to claim 1 wherein said wall is presented by a concavely dished portion of one of the housing plates.

3. A suspension unit according to claim 2 in which the first chamber is occupied by a flexible bag encompassing air thereby to prevent the mixing of oil and air to any marked degree in the first chamber.

References Cited

UNITED STATES PATENTS

| | | | |
|---|---|---|---|
| 2,192,355 | 3/1940 | Kuhn | 267—35 |
| 2,818,249 | 12/1957 | Boschi | 267—33 |
| 2,524,405 | 10/1950 | Storrs | 248—358 AA |
| 2,822,164 | 2/1958 | Boschi | 248—358 R X |

GERALD M. FORLENZA, Primary Examiner

H. BELTRAN, Assistant Examiner

U.S. Cl. X.R.

105—197 A; 267—3